US009031825B1

(12) United States Patent
McGaughy

(10) Patent No.: US 9,031,825 B1
(45) Date of Patent: May 12, 2015

(54) STATISTICAL CIRCUIT SIMULATION

(75) Inventor: Bruce McGaughy, Fremont, CA (US)

(73) Assignee: Proplus Design Solutions, Inc., San Jose, CA (US)

( * ) Notice: Subject to any disclaimer, the term of this patent is extended or adjusted under 35 U.S.C. 154(b) by 512 days.

(21) Appl. No.: 13/437,815

(22) Filed: Apr. 2, 2012

Related U.S. Application Data

(60) Provisional application No. 61/493,403, filed on Jun. 3, 2011.

(51) Int. Cl.
G06G 7/48 (2006.01)
G06F 17/50 (2006.01)
G06F 9/50 (2006.01)
G06K 9/62 (2006.01)

(52) U.S. Cl.
CPC ........ *G06F 17/5022* (2013.01); *G06F 17/5036* (2013.01); *G06F 9/5066* (2013.01); *G06F 17/5072* (2013.01); *G06F 17/5009* (2013.01); *G06K 9/6218* (2013.01)

(58) Field of Classification Search
CPC ............ G06F 17/5072; G06F 17/5022; G06F 17/5036; G06F 17/5009; G06F 9/5061; G06F 9/5066; G06K 9/6218
USPC .......................................................... 703/14
See application file for complete search history.

(56) References Cited

U.S. PATENT DOCUMENTS 7,024,652 B1* 4/2006 McGaughy et al. .......... 716/115
7,134,100 B2* 11/2006 Ravi et al. ..................... 716/103
7,340,698 B1* 3/2008 Srinivasan et al. ............ 716/113
7,469,394 B1* 12/2008 Hutton et al. .................. 716/113
7,594,095 B1* 9/2009 Nordquist ........................ 712/22
8,020,134 B2* 9/2011 Dotson et al. .................. 716/124
8,738,349 B2* 5/2014 Bertacco et al. ................ 703/15
2010/0250187 A1* 9/2010 Zuber et al. .................... 702/179

OTHER PUBLICATIONS eCircuit Center, "Spice Algorithm Overview", 2003, downloaded Sep. 16, 2014.*
Gulati et al, "Accelerating Circuit Simulation Using Graphics Processors", Hardware Acceleration of EDA Algorithms, pp. 153-165, Jan. 18, 2010.*
Kulkarni et al, "Design-Time Optimization of Post-Silicon Tuned Circuits Using Adaptive Body Bias", IEEE Transactions on Computer-Aided Design of Integrated Circuits and Systems, vol. 27. No. 3, Mar. 2008.*

(Continued)

Primary Examiner — Mary C Jacob
(74) Attorney, Agent, or Firm — Silicon Valley Patent Group LLP; Thomas C. Chan

(57) ABSTRACT

Method and system are disclosed for statistical circuit simulation. In one embodiment, a computer implemented method for statistical circuit simulation includes providing descriptions of a circuit for simulation, wherein the descriptions include variations of statistical parameters of the circuit, partitioning the circuit into groups of netlists according to variations of statistical parameters of the circuit, simulating the groups of netlists using a plurality of processors in parallel to generate a plurality of output data files, and storing the plurality of output data files in a memory. The method of partitioning the circuit into groups of netlists includes forming the groups of netlists to be simulated in a single instruction multiple data environment, and forming the groups of netlists according to proximity of variations of statistical parameters of the circuit.

17 Claims, 10 Drawing Sheets

(56) References Cited

OTHER PUBLICATIONS

Veetil et al, "Efficient Monte Carlo Based Incremental Statistical Timing Analysis", DAC, Jun. 8-13, 2008.*

Conti et al, "Parametric Yield Optimization of MOS IC's Affected by Device Mismatch", Analog Integrated Circuits and Signal Processing, 29, pp. 181-199, 2001.*

* cited by examiner

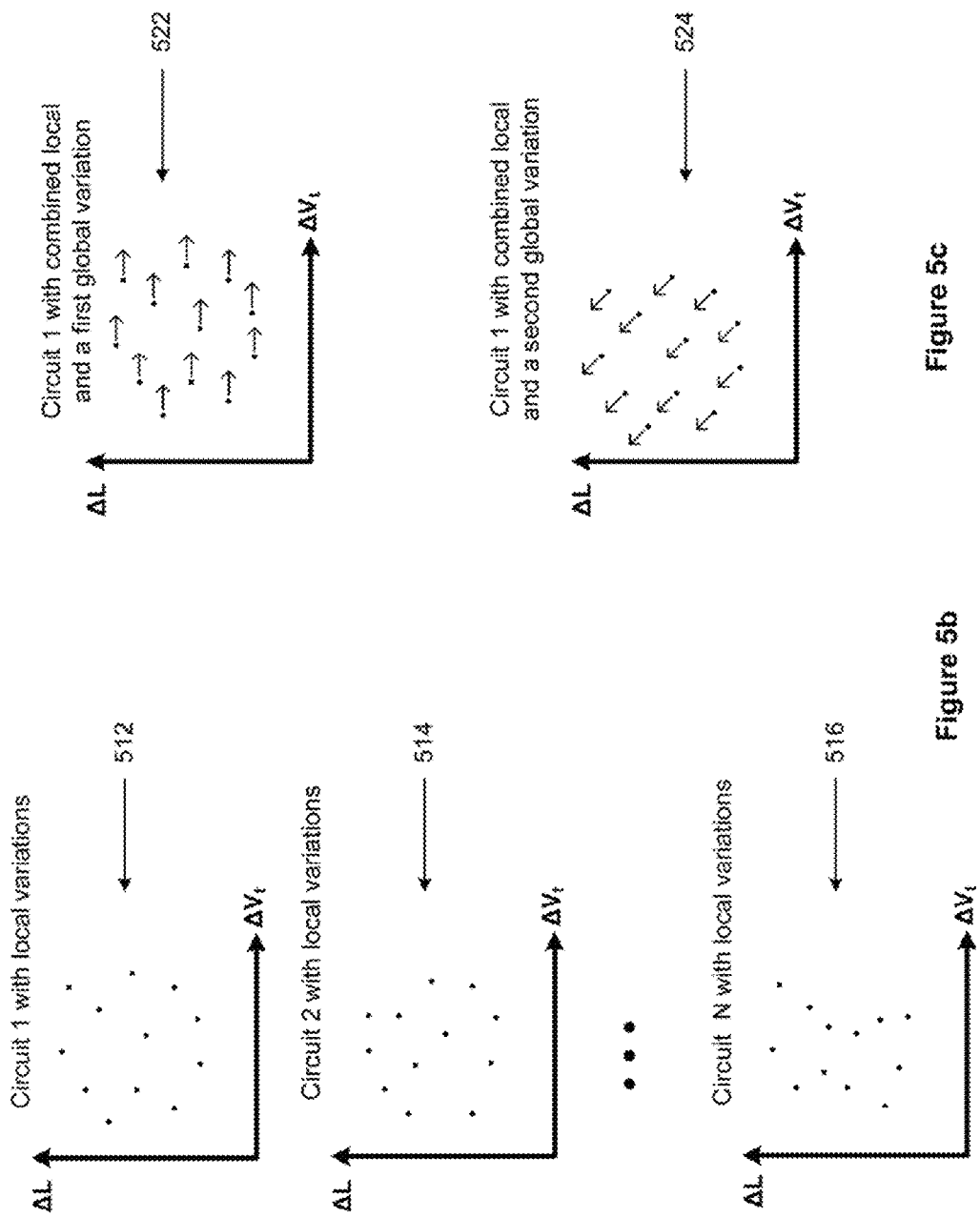

|  | Processor 0 | Processor 1 | Processor 2 |
|---|---|---|---|
| Sub-threshold | Occupied & Working | Occupied | Occupied |
| Linear | Occupied | Occupied & Working | Occupied |
| Saturation | Occupied | Occupied | Occupied & Working |

Figure 7a

|  | Processor 0 | Processor 1 | Processor 2 |
|---|---|---|---|
| Sub-threshold | Occupied & Working | Occupied & Working | Occupied & Working |
| Linear | Occupied & Working | Occupied & Working | Occupied & Working |
| Saturation | Occupied & Working | Occupied & Working | Occupied & Working |

Figure 7b

|  | Processor 0 | Processor 1 | Processor 2 |
|---|---|---|---|
| Sub-threshold | Occupied & Working | Occupied & Working | Occupied & Working |
| Linear | Idle | Idle | Idle |
| Saturation | Idle | Idle | Idle |

Figure 7c

|  | Processor 0 | Processor 1 | Processor 2 |
|---|---|---|---|
| Sub-threshold | Occupied & Working | Occupied & Working | Occupied & Working |
| Linear | Occupied & Working | Occupied & Working | Occupied & Working |
| Saturation | Idle | Idle | Idle |

Figure 7d

STATISTICAL CIRCUIT SIMULATION

CROSS REFERENCE TO RELATED APPLICATIONS

This application claims the benefit of U.S. provisional application No. 61/493,403, "Statistical Circuit Simulation" filed Jun. 3, 2011. The aforementioned United States application is hereby incorporated by reference in its entirety.

FIELD OF THE INVENTION

The present invention relates to the field of electronic design automation tools. In particular, the present invention relates to methods and systems for conducting statistical circuit simulation.

BACKGROUND OF THE INVENTION

An integrated circuit is a network of circuit elements such as resistors, capacitors, inductors, mutual inductors, transmission lines, diodes, bipolar junction transistors (BJT), junction field effect transistors (JFET), metal-oxide-semiconductor field effect transistors (MOSFET), metal-semiconductor field effect transistors (MESFET), thin-film transistors (TFT), etc.

The development of complicated integrated circuits often requires the use of powerful numerical simulation programs. For example, circuit simulation is an essential part in the design flow of integrated circuits, helping circuit designers to verify the functionality and performance of their designs without going through expensive fabrication processes. As the semiconductor processing technology migrates to nanometer dimensions, new simulation methodologies are needed to solve the new problems intrinsically existing in circuit design with nanometer features. Modern integrated circuits continually challenge circuit simulation algorithms and implementations in the development of new technology generations. The semiconductor industry requires EDA software with the ability to analyze nanometer effects like coupling noise, ground bounce, transmission line wave propagation, dynamic leakage current, supply voltage drop, and nonlinear device and circuit behavior, which are all related to dynamic current. Thus, detailed circuit simulation and transistor-level simulation have become one of the most effective ways to investigate and resolve issues with nanometer designs.

Examples of electronic circuit simulators include the Simulation Program with Integrated Circuit Emphasis (SPICE) developed at the University of California, Berkeley (UC Berkeley), and various enhanced versions or derivatives of SPICE. SPICE and its derivatives or enhanced versions will be referred to hereafter as SPICE circuit simulators, or SPICE. The SPICE method considers a circuit as a non-divided object.

SPICE-like simulations may provide fairly accurate predictions of how corresponding circuits will behave when actually built. The predictions are preferably made not only for individual sub-circuit but also for whole systems (e.g., whole integrated circuits) so that system-wide problems relating to noise and the like may be uncovered and dealt with. In a general process flow of a SPICE-like simulation, an analog integrated circuit under simulation is often represented in the form of a netlist description. A netlist is a circuit description of the analog circuit to be simulated written in a SPICE-like language. SPICE netlists are pure structural languages with simulation control statements. Other language like Verilog-A™ has the capability to include behavioral constructs. The structural netlist of SPICE together with a predefined set of circuit components of the analog integrated circuit may be represented in the form of a matrix in accordance with certain circuit modeling methodologies. The number of non-linear differential equations ranges from 1 to n. There are a corresponding number of input vectors to be operated by the linear equation. The set of input vectors are shown as $\{I_1, I_2, \ldots I_n\}$. Next, the linear matrix is computed with the set of input vectors to generate a set of solution vectors $\{V_1, V_2, \ldots V_n\}$. The computation is repeated until the set of solutions converge. The set of solutions may be then displayed in the form of waveforms, measurements, or checks on a computer screen for engineers to inspect the simulation results.

However, SPICE-like simulation of a whole system becomes more difficult and problematic as the industry continues its relentless trek of scaling down to smaller and smaller device geometries and of cramming more interconnected components into the system. An example of such down scaling is the recent shift from micron-sized channels toward deep submicron sized transistor channel lengths. Because of the smaller device geometries, a circuit designer are able to cram exponentially larger numbers of circuit components (e.g., transistors, diodes, capacitors) into a given integrated circuit (IC), and therefore increases the matrix size to a complexity which may not be solved in a desired time frame.

A circuit may be represented as a large numerically discrete nonlinear matrix for analyzing instant current. The matrix dimension is of the same order as the number of the nodes in the circuit. For transient analysis, this giant nonlinear system needs to solve hundreds of thousand times, thus restricting the capacity and performance of the SPICE method. The SPICE method in general can simulate a circuit up to about 50,000 nodes. Therefore it is not practical to use the SPICE method in full chip design. It is widely used in cell design, library building, and accuracy verification.

With some accuracy lost, the Fast SPICE method developed in the early 1990s provides capacity and speed about two orders of magnitude greater than the SPICE method. The performance gain was made by employing simplified models, circuit partition methods, and event-driven algorithms, and by taking advantage of circuit latency.

SPICE models a circuit in a node/element fashion, i.e., the circuit is regarded as a collection of various circuit elements connected at nodes. At the heart of SPICE is the so-called Nodal Analysis, which is accomplished by formulating nodal equations (or circuit equations) in matrix format to represent the circuit and by solving these nodal equations. The circuit elements are modeled by device models, which produce model results that are represented in the circuit equations as matrices.

A device model for modeling a circuit element, such as the SPICE model for modeling MOSFET devices, developed by UC Berkeley, typically includes model equations and a set of model parameters that mathematically represent characteristics of the circuit element under various bias conditions. For example, a circuit element with n terminals can be modeled by the following current-voltage relations:

$$I_i = f_i(V_1, \ldots, V_n, t) \text{ for } i=1, \ldots, n,$$

where $I_i$ represents the current entering terminal I; $V_j$ (j= 1, . . . , n) represents the voltage or terminal bias across terminal j and a reference terminal, such as the ground; and t represents the time. The Kirchhoff's Current Law implies that the current entering terminal n is given by $$I_n = \sum_{i=1}^{n-1} I_i.$$

A conductance matrix of the circuit element is defined by:

$$G(V_1, \ldots, V_n, t) := \begin{pmatrix} \frac{\partial f_1}{\partial V_1} & \cdots & \frac{\partial f_1}{\partial V_n} \\ \vdots & \ddots & \vdots \\ \frac{\partial f_n}{\partial V_1} & \cdots & \frac{\partial f_n}{\partial V_n} \end{pmatrix}.$$

To model the circuit element under alternating current (AC) operations, the device model also considers the relationship between node charges and the terminal biases:

$$Q_i = q_i(V_1, \ldots, V_n, t) \text{ for } i = 1, \ldots, n.$$

where $Q_i$ represents the node charge at terminal i. Thus, the capacitance matrix of the n-terminal circuit element is defined by $$C(V_1, \ldots, V_n, t) := \begin{pmatrix} \frac{\partial q_1}{\partial V_1} & \cdots & \frac{\partial q_1}{\partial V_n} \\ \vdots & \ddots & \vdots \\ \frac{\partial q_n}{\partial V_1} & \cdots & \frac{\partial q_n}{\partial V_n} \end{pmatrix}.$$

Solving a matrix can be very time consuming when the matrix size become very large for a nanometer design, as the computational cost is in the order of $n^3$, where n is the size of the matrix. During circuit simulation, the total simulation time T is proximately equal to $$T \approx \Sigma \text{Timestep}_i \times \text{Time}_{solve}^i$$

Where, $\text{Timestep}_i$ is the length of each time step, $\text{Time}_{solve}^i$ is solve time spent on time step i. In general the smaller the time steps, the more accurate the simulation. However, unnecessary small time steps can slow down the simulation, while a larger time step can lead to slower convergence as more iteration has to be taken to reach a converged solution. In practice, the time step has to be optimized to trade off between accuracy and total simulation time. When circuit simulation is used for statistical analysis, it can increase the total simulation time to be the product of total number of seeds and the corresponding simulation time spent on each seed. For a typical Monte-Carlo analysis, it can take more than a thousand simulations (seeds) to reach a converged solution.

To improve the performance of circuit simulation, conventional systems may employ multiple computers working together in solving a large complicated matrix, with each computer scheduled to process certain tasks of the simulation. These multiple computers, also referred to collectively as a server farm, may be placed in different geographical locations, and they are typically connected through a computer network. However, one of the drawbacks of the conventional systems is the synchronization and network data communication required between the computers, which have significantly compromised the benefits gained by processing multiple tasks in parallel. In addition, the conventional systems are very expensive because multiple computers are being used.

Therefore, there is a need for methods and systems that address the issues of the conventional simulation systems described above. Specifically, there is a need for methods and systems for conducting statistical circuit simulation.

SUMMARY

Method and system are disclosed for statistical circuit simulation. In one embodiment, a computer implemented method for statistical circuit simulation includes providing descriptions of a circuit for simulation, wherein the descriptions include variations of statistical parameters of the circuit, partitioning the circuit into groups of netlists according to variations of statistical parameters of the circuit, simulating the groups of netlists using a plurality of processors in parallel to generate a plurality of output data files, and storing the plurality of output data files in a memory. The method of partitioning the circuit into groups of netlists includes forming the groups of netlists to be simulated in a single instruction multiple data environment, and forming the groups of netlists according to proximity of variations of statistical parameters of the circuit. The descriptions of the circuit further include circuit netlists, and model library.

The computer implemented method of partitioning the circuit includes forming the groups of netlists to be simulated in a single instruction multiple data environment. The computer implemented method of partitioning the circuit further includes forming the groups of netlists according to proximity of variations of statistical parameters of the circuit. The computer implemented method further includes identifying a representative parameter to represent a group of statistical parameters, where the group of statistical parameters has substantially the same value as the representative parameter and the group of statistical parameters is substantially invariant. The proximity of variations of statistical parameters includes variations of threshold voltage of a transistor in the sub-threshold region, variations of threshold voltage of the transistor in a linear region, and variations of threshold voltage of the transistor in a saturation region.

The computer implemented method of simulating the groups of netlists using a plurality of processors in parallel includes maintaining the groups of netlists and their corresponding statistical parameters in a shared memory, performing model evaluations using the plurality of graphics processing units, and performing matrix solving, checking simulation convergence, and predicting next time step using the plurality of central processing units. The shared memory includes a model evaluation queue configured to store one or more tasks to be processed by the plurality graphics processing units, and a task queue configured to store one or more tasks to be processed by the plurality of central processing units. The computer implemented method further includes performing load balancing by assigning one or more tasks from the model evaluation queue to be handled by the plurality of central processing units, and performing load balancing by assigning one or more tasks from the task queue to be handled by the plurality of graphics processing units.

In another embodiment, a system for performing statistical circuit simulation includes a plurality of processors and a shared memory configured to be used by the plurality of processors, a simulator module configured to work with the plurality of processors, and a memory for storing the plurality of output data files. The simulator module includes logic configured to provide descriptions of a circuit for simulation, wherein the descriptions include variations of statistical parameters of the circuit, logic configured to partition the circuit into groups of netlists according to variations of statistical parameters of the circuit, and logic configured to simulate the groups of netlists using the plurality of processors in parallel to generate a plurality of output data files, where the plurality of processors include a plurality of graphics processing units and a plurality of central processing units.

In yet another embodiment, a computer program product includes a non-transitory medium storing computer programs for execution by one or more computer systems, the computer program product further includes code for providing descriptions of a circuit for simulation, wherein the descriptions include variations of statistical parameters of the circuit, code for partitioning the circuit into groups of netlists according to variations of statistical parameters of the circuit, code for simulating the groups of netlists using a plurality of processors in parallel to generate a plurality of output data files, where the plurality of processors include a plurality of graphics processing units and a plurality of central processing units, and code for storing the plurality of output data files in a memory.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

FIGS. 5a-5c illustrate method of statistical circuit simulation according to embodiments of the present disclosure.

FIG. 7 illustrates a method of simulating groups of netlists using a plurality of processors in parallel according to embodiments of the present disclosure.

DESCRIPTION OF EMBODIMENTS

Methods and systems are provided for conducting statistical circuit simulation. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
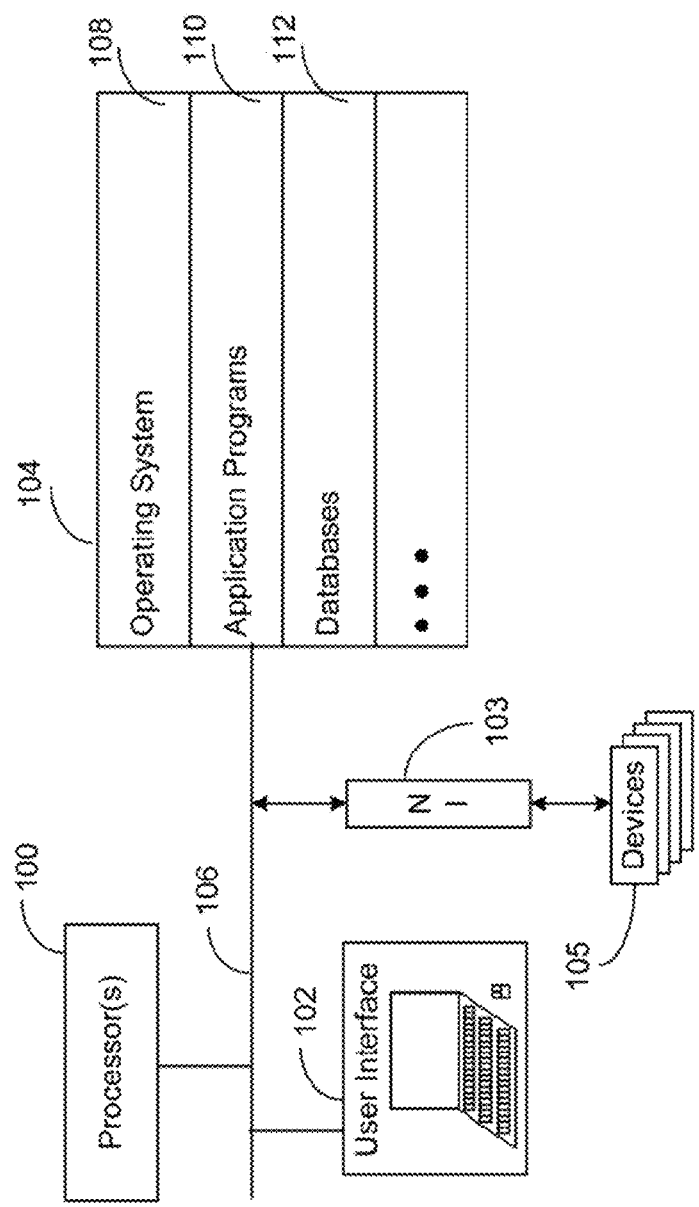
FIG. 1 illustrates a system for implementing methods of conducting statistical circuit simulation according to an embodiment of the present disclosure.

FIG. 1 illustrates a system for implementing methods of conducting statistical circuit simulation according to an embodiment of the present disclosure. In one embodiment, the method and system for conducting statistical circuit simulation may be implemented using a computer system. The computer system may include one or more graphics processing units (GPUs) and/or central processing units (CPUs) 100, at least a user interface 102 for displaying computation results and waveforms, a memory device 104, a system bus 106, and one or more bus interfaces for connecting the GPUs/CPUs, user interface, memory device, and system bus together. The computer system also includes at least one network interface 103 for communicating with other devices 105 on a computer network. In alternative embodiments, certain functionalities of the method and system may be implemented in one or more application-specific integrated circuits (ASICs) or field-programmable gate arrays (FPGAs), thereby reducing the role of the GPU/CPU.

The memory device 104 may include high-speed random-access memory and may also include non-volatile memory, such as one or more magnetic disk storage devices. The memory device may also include mass storage that is located remotely from the GPUs/CPUs. The memory device preferably stores:
  an operating system 108 that includes procedures for handling various basic system services and for performing hardware-dependent tasks;
  application programs 110 for performing other user-defined applications and tasks, such as circuit simulations and device evaluations;
  databases 112 for storing information of the integrated circuit, the databases include data structures, device models, and matrices.

The databases, the application programs, and the program for implementing a parallel matrix solver for circuit simulation may include executable procedures, sub-modules, tables, and other data structures. In other embodiments, additional or different modules and data structures may be used, and some of the modules and/or data structures listed above may not be used.

Figure 2:
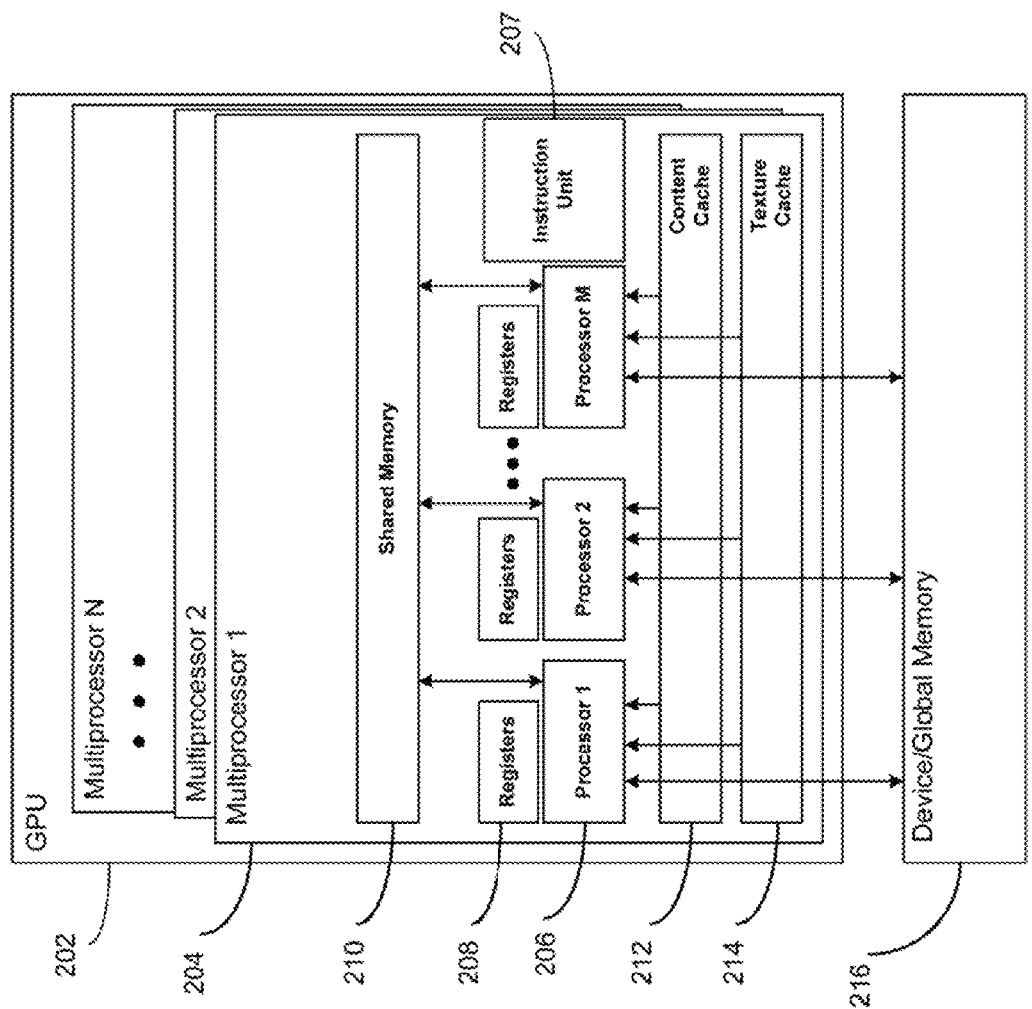
FIG. 2 illustrates an overview of methods for conducting statistical circuit simulation according to embodiments of the present disclosure.

FIG. 2 illustrates an exemplary architecture of a graphics processor unit according to embodiments of the present disclosure. As shown in FIG. 2, each GPU 202 includes N multiprocessors. Each multiprocessor 204 further includes M processors 206 and an instruction unit 207. Each processor has its own registers 208. All the processors 206 in one multiprocessor 204 share a block of shared memory 210. All the processors share the same set of constant cache 212 and texture cache 214 memories. They can also access the data in device memory 216, which is also referred to as the global memory.

In this example, each multiprocessor 204 has a block of shared memory. Accessing data from the shared memory 210 is much faster than accessing data from the device (global) memory 216. For this reason, one approach to increase computational efficiency is to load the data from the global memory 216 to the shared memory 210, perform much of the computations/manipulations using the shared memory 210, and then write back the results from the shared memory 210 to the global memory 216.

Figure 3:
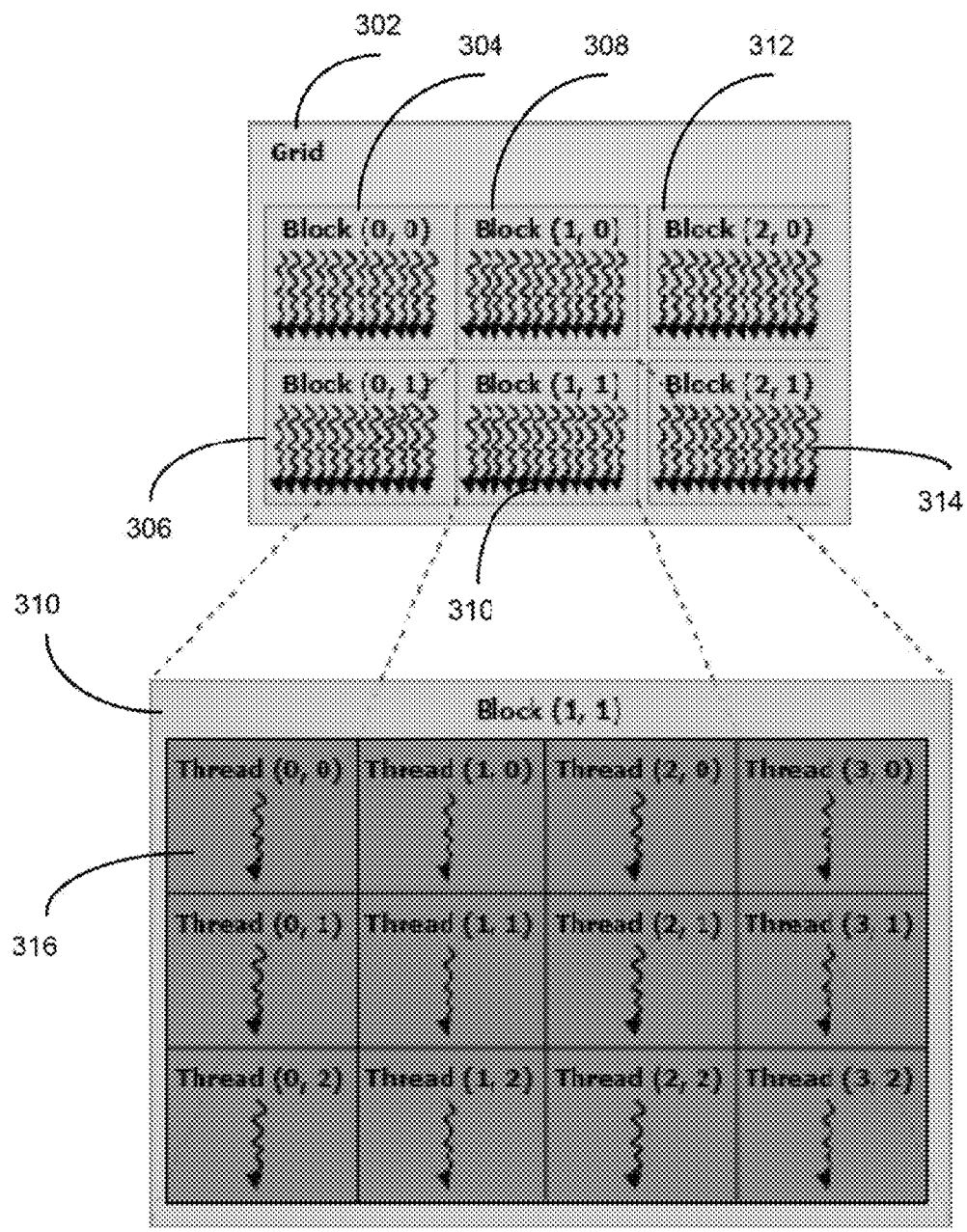
FIG. 3 illustrates an exemplary block diagram for conducting methods of conducting statistical circuit simulation according to embodiments of the present disclosure.

FIG. 3 illustrates an exemplary arrangement of threads in a GPU according to embodiments of the present disclosure. In this example, threads are arranged in a grid 302, and they are divided into blocks of threads, for example block (0,0) 304, block (0,1) 306, block (1,0) 308, block (1,1) 310, block (2,0) 312, and block (2,1) 314. Each block of threads (for example block (1,1) 310, is assigned to one multiprocessor and threads within one block, for example thread (0,0) 316, can communicate with each other using the shared memory as described in association with FIG. 2.

In a statistical circuit simulation, there are hundreds of branches of codes employed to simulate different scenarios that may occur in a circuit. For example, a transistor model may be operating in sub-threshold region, linear region, or saturation region based on different combination of statistical parameters chosen for simulation. Each branch of codes can have instructions to simulate variations of statistical parameters for a region. In practice, there may be hundreds of different models to simulate. To achieve high efficiency in the single instruction multiple data (SIMD) simulation environment, embodiments of the present disclosure are designed to maximize the number of parallel processing of the set of multiprocessors described in FIG. 3. This is further described in association with FIG. 4 to FIG. 7 below.

Figure 4:
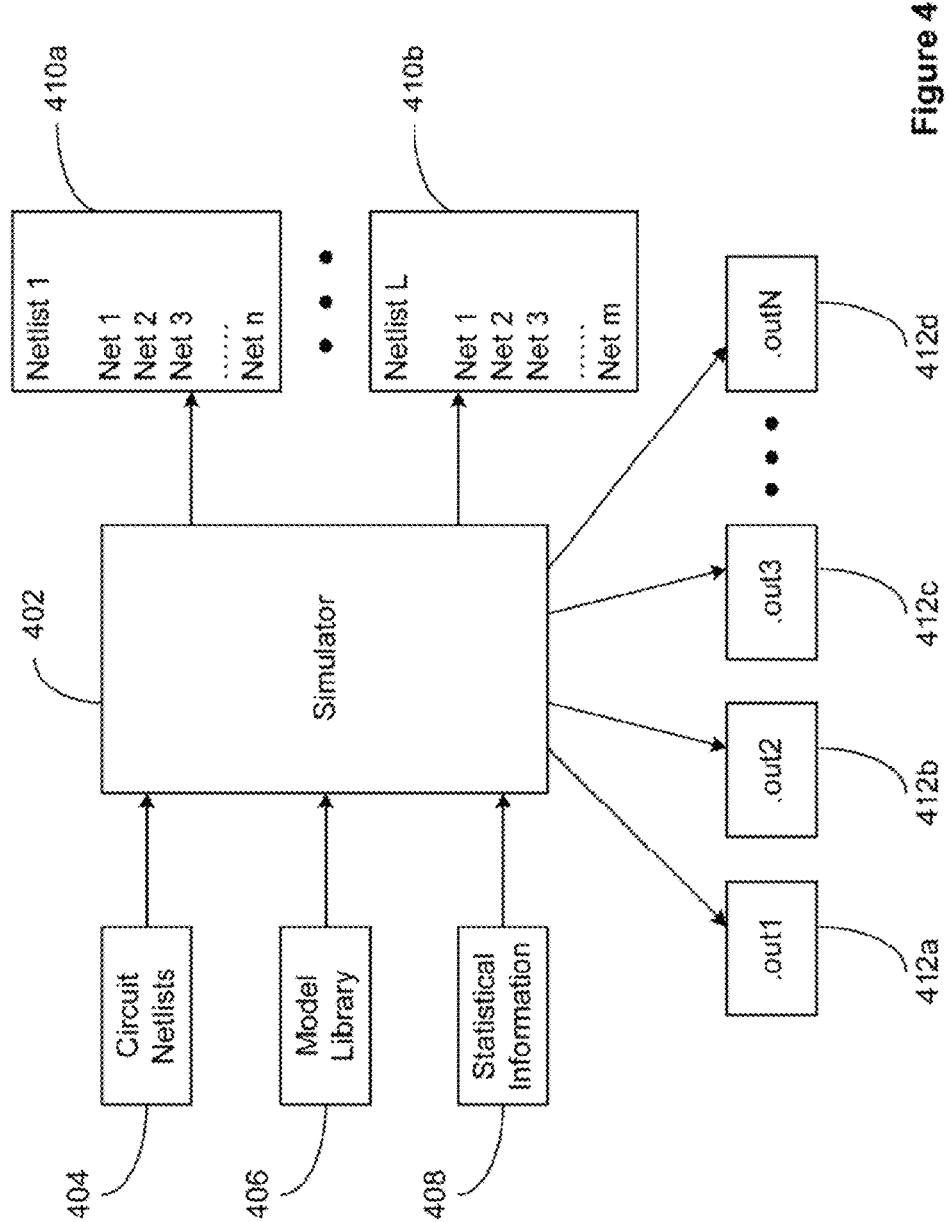
FIG. 4 illustrates an exemplary block diagram of a simulation environment according to embodiments of the present disclosure.

FIG. 4 illustrates an exemplary block diagram of a simulation environment according to embodiments of the present disclosure. As shown in FIG. 4, the simulation environment includes a simulator 402, which takes circuit netlists 404, model library 406, and statistical information 408 as inputs. Based on the inputs, the simulator partitions the circuit to form multiple groups of netlists, such as Netlist 1 (410a) to Netlist L (410b). Each group includes multiple nets, such as Net 1 to Net n in Netlist 1 (410a), and Net 1 to Net m in Netlist L (410b). By simulating the multiple groups in parallel, the simulator generates multiple output files, namely .out1 (412a), .out2 (412b), .out3 (412c), .outN (412d), and so on. Using the multiple groups of netlists, they enable the multiple set of processors to have higher probability to stay in the same branch of code and therefore to have higher probability to operate in parallel in performing statistical circuit simulation in the SIMD environment.

According to embodiments of the present disclosure, statistical variations may occur due to manufacturing process variations, which includes global variations and local variations. For local variations, each point on a graph, such as FIG. 5b shown below, represents one subcircuit (such as a transistor) in a netlist under simulation. For global variations, each point on a graph, such as FIG. 5c shown below, represents the difference from nominal values, and a netlist may be configured to simulate for each point.

Figure 5A:
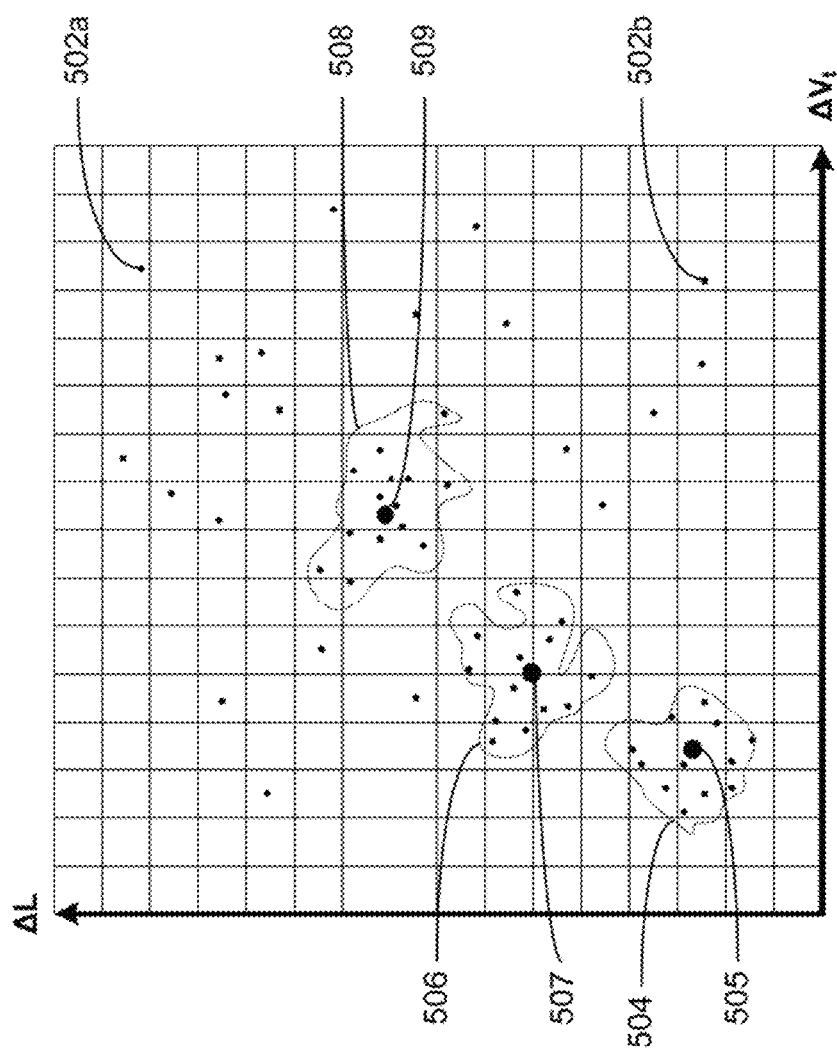

FIGS. 5a-5c illustrate methods of statistical circuit simulation according to embodiments of the present disclosure. As shown in FIG. 5a, for simplicity of illustration, only threshold voltage (Vt) and channel length (L) of a transistor are shown as varying statistical parameters in this example. The horizontal axis represents the change in threshold voltage (Vt), and the vertical axis represents the change in channel length (L). Variations of statistical parameters with respect to one another are shown as scattered dots, such as 502a and 502b, in this graph. According to embodiments of the present disclosure, the method identifies clusters of statistical parameters such as 504, 506, and 508. In some implementations, each cluster includes a group of statistical parameters where variations within the group may not change the outcome of a simulation. In some other implementations, each cluster includes a group of statistical parameters where variations within the group may only change the outcome of the simulation within a predetermined range, such as Vout (not shown) within +/−0.01V. For example, cluster 504 may represent a transistor model in the sub-threshold region, cluster 506 may represent the transistor model in the linear region, and cluster 508 may represent the transistor model in the saturation region. In such cases, a representative parameter may be used to represent the group, for example representative parameters 505, 507, and 509 for clusters 504, 506, and 508 respectively. The representative parameter may be used in simulation for the statistical parameters in the cluster. As a result, the number of computations and amount of memory used for storing the parameters would be reduced.

FIG. 5b illustrates examples of statistical circuit simulation of local variations due to manufacturing process variations. As shown in FIG. 5b, numeral 512 represents exemplary circuit 1 with local variations, numeral 514 represents exemplary circuit 2 with local variations, and number 516 represents exemplary circuit N with local variations. Note that each point in the graph FIG. 5b represents one transistor in one netlist of FIG. 4, for example. FIG. 5c illustrates examples of statistical circuit simulation of combination of local and global variations due to manufacturing process variations. In the examples shown in FIG. 5c, numeral 522 represents situations of exemplary circuit 1 with combined local and a first global variation, and numeral 524 represents situations of exemplary circuit 1 with combined local and a second global variation. Note that each point in the graph FIG. 5c represents the difference from nominal values. In one implementation, one netlist may be configured to simulate for each corresponding point in the graph FIG. 5c.

Figure 6:
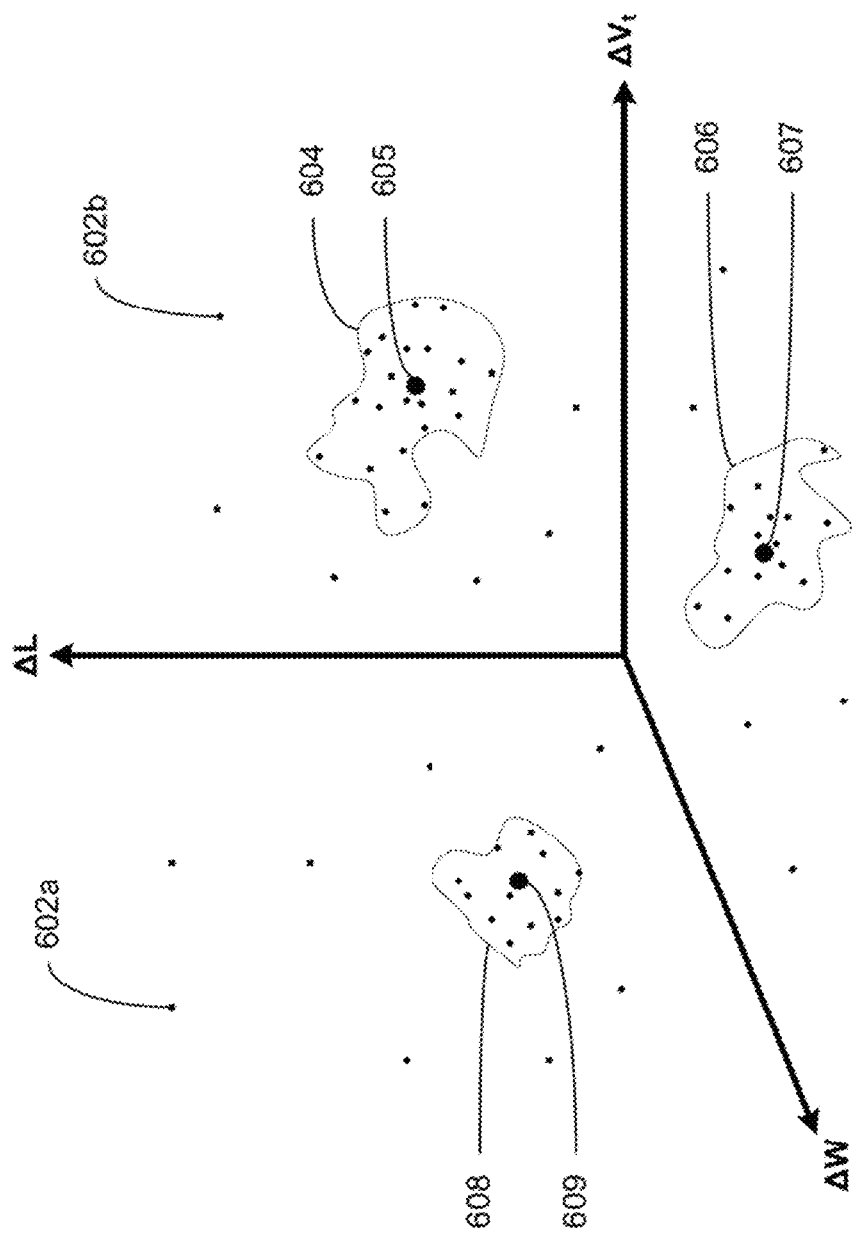
FIG. 6 illustrates a method of partitioning a circuit into groups of netlists according to embodiments of the present disclosure.

FIG. 6 illustrates a method of partitioning a circuit into groups of netlists according to embodiments of the present disclosure. In FIG. 6, for simplicity of illustration, only three statistical parameters, namely threshold voltage (Vt), channel length (L), and channel width (W) of a transistor are shown as varying statistical parameters in this example. A first axis represents the change in threshold voltage (Vt), a second axis represents the change in channel length (L), and a third axis represents the change in channel width (W). Variations of statistical parameters with respect to one another are shown as scattered dots, such as 602a and 602b, in this graph. Similar to the method shown in FIG. 5, the method identifies clusters of statistical parameters such as 604, 606, and 608. In some implementations, each cluster includes a group of statistical parameters where variations within the group may not change the outcome of a simulation. In some other implementations, each cluster includes a group of statistical parameters where variations within the group may only change the outcome of the simulation within a predetermined range, such as Ids (not shown) within +/−0.01A. Similarly, cluster 604 may represent a transistor model in the sub-threshold region, cluster 606 may represent the transistor model in the linear region, and cluster 608 may represent the transistor model in the saturation region. In such cases, a representative parameter may be used to represent the group, for example representative parameters 605, 607, and 609 for clusters 604, 606, and 608 respectively. The representative parameter may be used in simulation for the statistical parameters in the cluster. As a result, the number of computations and amount of memory used for storing the parameters would be reduced.

FIGS. 7a-7d provide a comparison of performing statistical circuit simulation without and with grouping of nets according to variations of statistical parameters. For simplicity of illustration, the examples use three processors, namely processor 0, processor 1, and processor 2 are shown in the table. According to embodiments of the present disclosure, many more processors, for example 8, 16, or more processors, can be employed to simulate variations of hundreds of statistical models in parallel in a real circuit.

FIG. 7a illustrates a conventional approach to perform statistical circuit simulation without grouping of nets. When the nets of a circuit are not grouped in the case of FIG. 7a, simulation points selected may end up with models in each of the sub-threshold, linear, and saturation regions. In this case, when a transistor being simulated is in the sub-threshold region, processor 0 is occupied and working, while processor 1 and processor 2 are occupied but not working because the cache may be occupied with models and libraries related to the sub-threshold region. In the linear region, processor 1 is occupied and working, while processor 0 and processor 2 are occupied but not working. In the saturation region, processor 2 is occupied and working, while processor 0 and processor 1 are occupied and working. In each of the instance when a processor is occupied but not working, efficiency has been lost, which in turn increases time and cost of simulation. In practice, there may be hundreds of branches and there may be hundreds of models that are being simulated. In every branch, if the processors do not operate together, the simulation efficiency is adversely impacted.

FIG. 7b illustrates method of simulating groups of netlists using a plurality of processors in parallel according to embodiments of the present disclosure. When the nets of a circuit are grouped according to variations of statistical parameters, evaluation points can be selected to be more likely to behave in similar manner and stay in a same branch of codes during simulation. As shown in the example of FIG. 7b, when a transistor being simulated is in the sub-threshold region, all three processors, namely processor 0, processor 1, and processor 2 are occupied and working. Similarly, in the linear region and saturation regions, processor 0, processor 1, and processor 2 are occupied and working. In this manner, the probability of the processors being occupied and working is higher, which in turn reduces time and cost of simulation. In general, the more frequent the processors operate together, the higher the simulation efficiency.

FIG. 7c illustrates another scenario of simulating groups of netlists using a plurality of processors in parallel according to embodiments of the present disclosure. The case of FIG. 7c is similar to that of FIG. 7b where all three processors, processor 0, processor 1 and processor 2, are occupied and working in parallel because they are executing instructions of a same branch (using shared resources) in the sub-threshold region. After completing execution of instructions in the sub-threshold region, the three processors are free (in idle mode) and ready to take on other tasks. When the processors take on a new task, for example operating together in the linear region as shown in FIG. 7d, high efficiency of statistical circuit simulation is maintained. Note that the each processor described above may be a graphics processor, a multiprocessor, or a vector processor.

Figure 8:
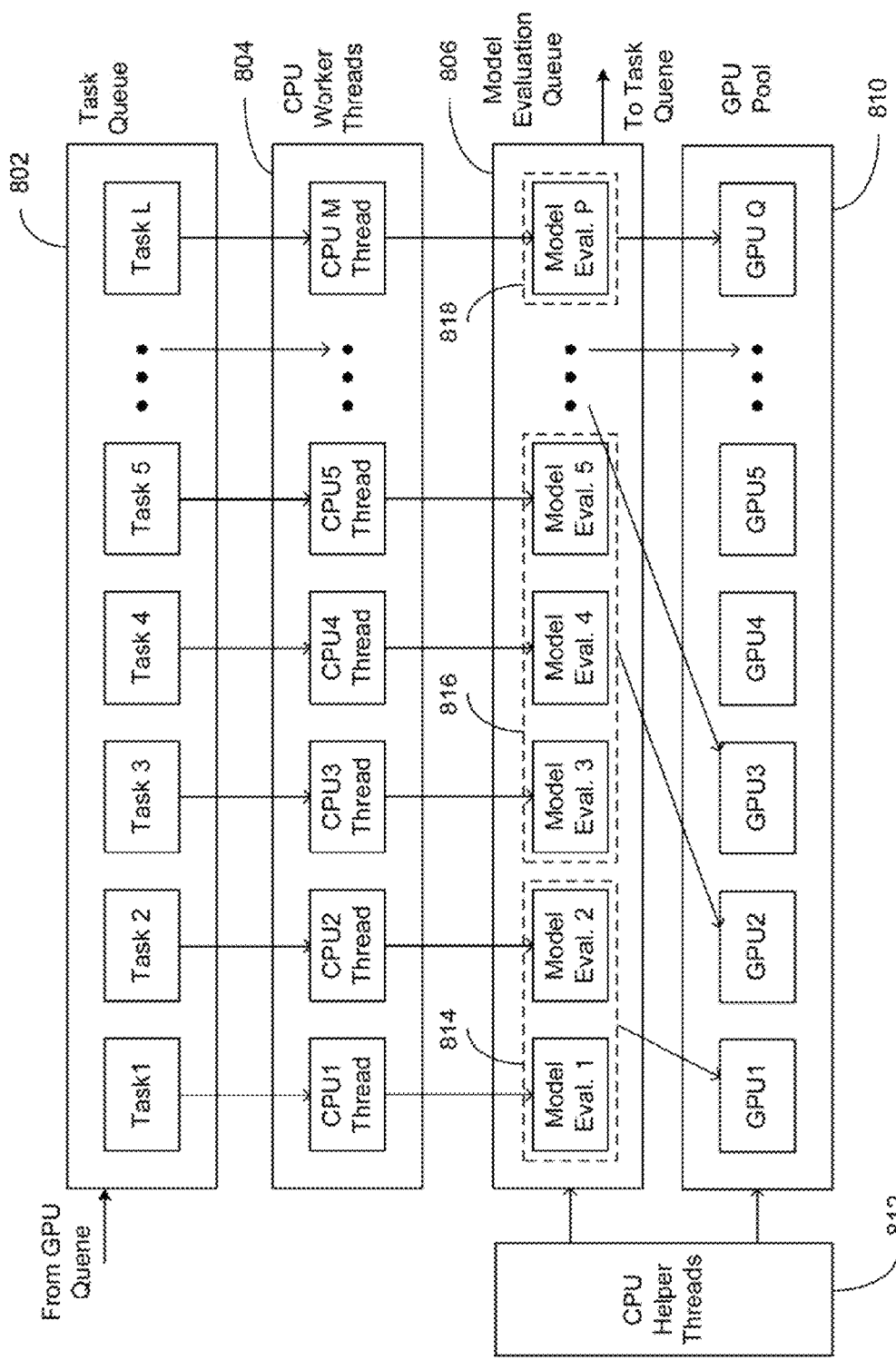
FIG. 8 illustrates a system for conducting statistical circuit simulation in parallel according to embodiments of the present disclosure.

FIG. 8 illustrates a system for conducting statistical circuit simulation in parallel according to embodiments of the present disclosure. As shown in FIG. 8, the system includes a task queue 802, a set of central processing units (not shown) and their corresponding CPU worker threads 804, a model evaluation queue 806, a GPU pool 810, and CPU helper threads 812. The task queue 802 is configured to store multiple simulation tasks, for example from Task 1 through Task L. The CPU worker threads 804 may include multiple CPU threads, for example from CPU1 thread through CPU M thread. The model evaluation queue 806 is configured to store multiple model evaluation tasks, for example from Model Evaluation 1 task to Model Evaluation P task. The CPU Helper Threads 812 is configured to group model evaluation tasks in the model evaluation queue 806 for processing by the GPUs in the GPU pool 810. For example, numeral 814 represents one group containing Model Evaluation 1 task and Model Evaluation 2 task; numeral 816 represents another group containing Model Evaluation 3 through Model Evaluation 5 tasks; numeral 818 represents yet another group containing Model Evaluation P task. Each group of Model Evaluation tasks may then be processed by their corresponding GPU in the GPU pool 810.

According to embodiments of the present disclosure, the tasks of performing statistical simulation of a circuit can be distributed and shared among a set of CPUs and a set of GPUs. Each simulation task may include, but not limited to, model evaluation, matrix solving, checking convergence, and predicting next time step. The GPUs are more efficient in performing model evaluations and the CPUs are more efficient in performing matrix solving, checking simulation convergence, and predicting next time step. Therefore, each simulation task may be divided into two phases: a phase the CPUs can handle efficiently and a phase the GPUs can handle efficiently. In handling simulation tasks at each time step, the system can be configured to move back and forth between the task queue 802 and model evaluation queue 806 in order to manage the distribution of the simulation tasks and perform load balancing to ensure optimal system performance.

Note that to be efficient, it is preferable to configure the GPUs to perform a large quantity of tasks. The system works well for statistical simulation of large circuits with millions of devices. For statistical simulation of smaller circuits, to increase the efficiency of the GPUs, a number of model evaluation tasks may be grouped prior to be processed by the GPUs. For example, multiple model evaluations tasks may be grouped together for processing, such as groups 814, 816 and 818 as shown in FIG. 8. For statistical simulation applications, many instances of a smaller circuit may be created, which may require tens of thousands of separate simulations to accomplish a 3-Sigma statistical simulation. GPUs can be used to increase the efficiency of such statistical simulation because the GPUs may be configured to handle a large quantity of model evaluations in parallel. In this way, enough tasks may be gather to keep the GPUs occupied and thus improving efficiency of the simulation.

According to embodiments of the present disclosure, the system can be configured to perform load balancing between tasks contained in the model evaluation queue 806 and tasks contained in the task queue 802. In situations when operations of the GPUs are slower than operations of the CPUs, the CPUs and the CPU worker threads 804 can be configured to take one or more tasks from the model evaluation queue 806 while waiting for the GPUs. In this way, the CPUs are kept busy and the system offloads some of the loadings of the GPUs to the CPUs. Similarly, in situations when operations of the CPUs are slower than operations of the GPUs, the GPUs and the CPU helper threads 812 can be configured to take one or more tasks from the task queue 802 while waiting for the CPUs. In this way, the GPUs are kept busy and the system offloads some of the loadings of the CPUs to the GPUs.

Figure 9:
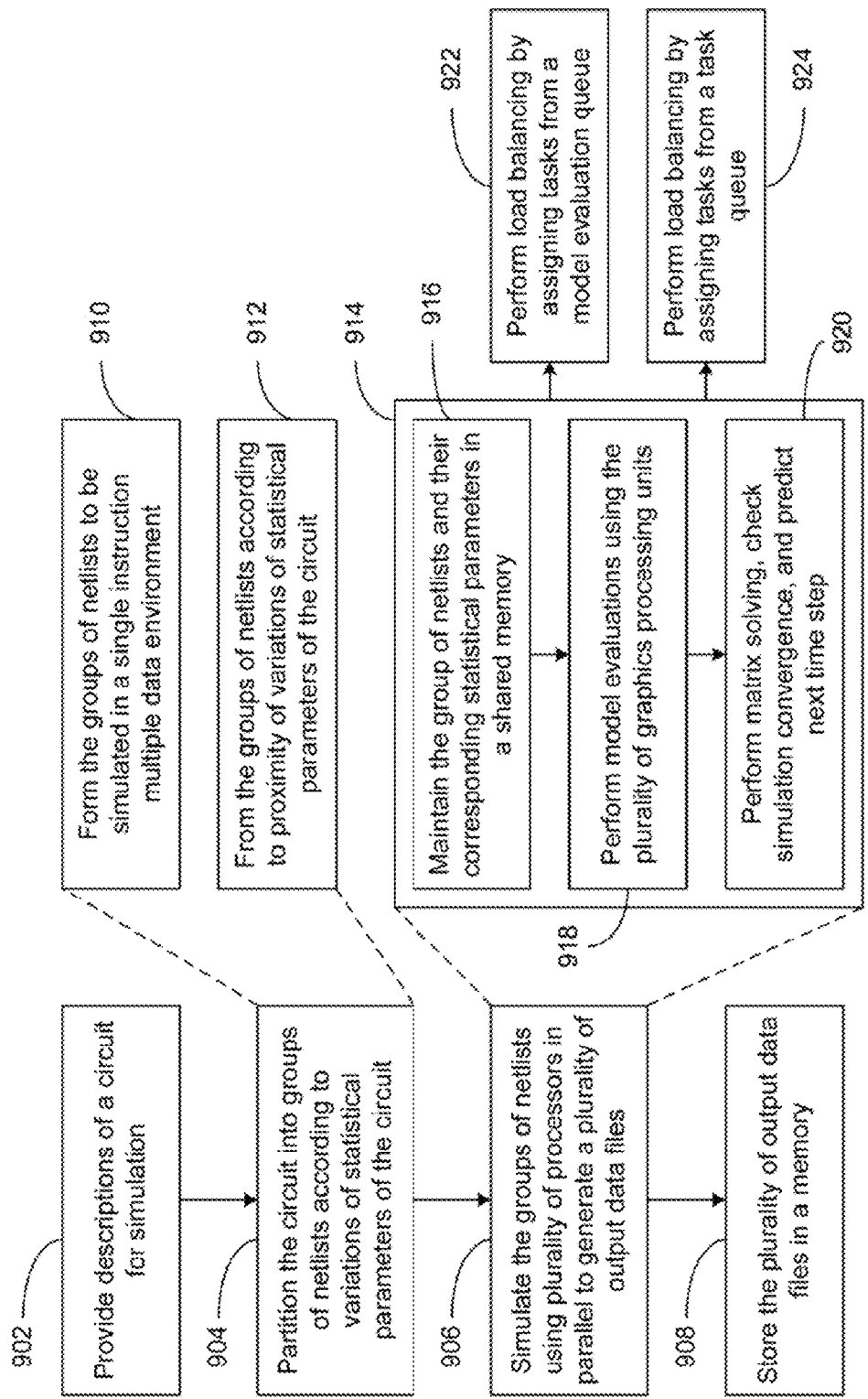
FIG. 9 illustrates an exemplary flow chart implemented by the simulator 402 of FIG. 4 according to some aspects of the present disclosure.

FIG. 9 illustrates an exemplary flow chart implemented by the simulator 402 of FIG. 4 according to some aspects of the present disclosure. In block 902, the simulator 402 can include logic configured to provide descriptions of a circuit for simulation, where the descriptions include variations of statistical parameters of the circuit. In block 904, the simulator 402 can include logic configured to partition the circuit into groups of netlists according to variations of statistical parameters of the circuit. In block 906, the simulator 402 can include logic configured to simulate the groups of netlists using a plurality of processors in parallel to generate a plurality of output data files, where the plurality of processors include a plurality of graphics processing units and a plurality of central processing units. In block 908, the simulator 402 can include logic configured to store the plurality of output data files in a memory.

According to embodiments of the present disclosure, the logic implemented in block 904 may further include logic described in blocks 910-912. For example, in block 910, the simulator 402 can include logic configured to form the groups of netlists to be simulated in a single instruction multiple data environment. In block 912, the simulator 402 can include logic configured to form the groups of netlists according to proximity of variations of statistical parameters of the circuit. In addition, the simulator 402 can include logic configured to identify a representative parameter to represent a group of statistical parameters, where the group of statistical parameters has substantially the same value as the representative parameter and the group of statistical parameters is substantially invariant.

According to embodiments of the present disclosure, the logic implemented in block 906 may further include logic described in blocks 914-920. For example, in block 916, the simulator 402 can include logic configured to maintain the groups of netlists and their corresponding statistical parameters in a shared memory. The shared memory includes a model evaluation queue configured to store one or more tasks to be processed by the plurality of graphics processing units, and a task queue configured to store one or more tasks to be processed by the plurality of central processing units. In block 918, the simulator 402 can include logic configured to perform model evaluations using plurality of graphics processing units. In block 920, the simulator 402 can include logic configured to perform matrix solving, check simulation convergence, and predict next time step using plurality of central processing units.

According to embodiments of the present disclosure, the logic implemented in block 914 may further include logic described in blocks 922-924. For example, in block 922, the simulator 402 can include logic configured to perform load balancing by assigning one or more tasks from the model evaluation queue to be handled by the plurality of central processing units. In block 924, the simulator 402 can include logic configured to perform load balancing by assigning one or more tasks from the task queue to be handled by the plurality of graphics processing units.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A computer implemented method for statistical circuit simulation, comprising:
   providing descriptions of a circuit for simulation, wherein the descriptions include variations of statistical parameters of the circuit;
   partitioning the circuit into groups of netlists according to variations of statistical parameters of the circuit, wherein partitioning further comprises forming the groups of netlists according to proximity of variations of statistical parameters of the circuit, and wherein proximity of variations of statistical parameters comprises variations of threshold voltage of a transistor in a sub-threshold region, variations of threshold voltage of the transistor in a linear region, and variations of threshold voltage of the transistor in a saturation region;
   simulating the groups of netlists using a plurality of processors in parallel to generate a plurality of output data files, wherein the plurality of processors include a plurality of graphics processing units and a plurality of central processing units; and
   storing the plurality of output data files in a memory.

2. The computer implemented method of claim 1, wherein descriptions of the circuit further includes circuit netlists, and model library.

3. The computer implemented method of claim 1, wherein partitioning comprises:
   forming the groups of netlists to be simulated in a single instruction multiple data environment.

4. The computer implemented method of claim 1, further comprises:
   identifying a representative parameter to represent a group of statistical parameters, wherein the group of statistical parameters has substantially the same value as the representative parameter and the group of statistical parameters is substantially invariant.

5. The computer implemented method of claim 1, wherein simulating the groups of netlists using a plurality of processors in parallel comprises:
  maintaining the groups of netlists and their corresponding statistical parameters in a shared memory;
  performing model evaluations using the plurality of graphics processing units; and
  performing matrix solving, checking simulation convergence, and predicting next time step using the plurality of central processing units.

6. The computer implemented method of claim 5, wherein the shared memory comprises:
  a model evaluation queue configured to store one or more tasks to be processed by the plurality of graphics processing units; and
  a task queue configured to store one or more tasks to be processed by the plurality of central processing units.

7. The computer implemented method of claim 6 further comprising:
  performing load balancing by assigning one or more tasks from the model evaluation queue to be handled by the plurality of central processing units.

8. The computer implemented method of claim 6 further comprising:
  performing load balancing by assigning one or more tasks from the task queue to be handled by the plurality of graphics processing units.

9. A system for performing statistical circuit simulation, comprising:
  a plurality of processors and a shared memory configured to be used by the plurality of processors;
  a simulator module configured to work with the plurality of processors, wherein the simulator module comprises
  logic configured to provide descriptions of a circuit for simulation, wherein the descriptions include variations of statistical parameters of the circuit;
  logic configured to partition the circuit into groups of netlists according to variations of statistical parameters of the circuit, wherein logic configured to partition the circuit further comprises logic configured to form the groups of netlists according to proximity of variations of statistical parameters of the circuit, and wherein proximity of variations of statistical parameters comprises variations of threshold voltage of a transistor in a sub-threshold region, variations of threshold voltage of the transistor in a linear region, and variations of threshold voltage of the transistor in a saturation region;
  logic configured to simulate the groups of netlists using the plurality of processors in parallel to generate a plurality of output data files, wherein the plurality of processors include a plurality of graphics processing units and a plurality of central processing units; and
  a memory for storing the plurality of output data files.

10. The system of claim 9, wherein descriptions of the circuit further includes circuit netlist, and model library.

11. The system of claim 9, wherein logic configured to partition the circuit comprises:
  logic configured to form the groups of netlists to be simulated in a single instruction multiple data environment.

12. The system of claim 9 further comprises:
  logic configured to identify a representative parameter to represent a group of statistical parameters, wherein the group of statistical parameters has substantially the same value as the representative parameter and the group of statistical parameters is substantially invariant.

13. The system of claim 9, wherein logic configured to simulate the groups of netlists using a plurality of processors in parallel comprises:
  logic configured to maintain the groups of netlists and their corresponding statistical parameters in a shared memory;
  logic configured to perform model evaluations using the plurality of graphics processing units; and
  logic configured to perform matrix solving, checking simulation convergence, and predicting next time step using the plurality of central processing units.

14. The system of claim 13, wherein the shared memory comprises:
  a model evaluation queue configured to store one or more tasks to be processed by the plurality of graphics processing units; and
  a task queue configured to store one or more tasks to be processed by the plurality of central processing units.

15. The system of claim 14 further comprising:
  logic configured to perform load balancing by assigning one or more tasks from the model evaluation queue to be handled by the plurality of central processing units.

16. The system of claim 14 further comprising:
  logic configured to perform load balancing by assigning one or more tasks from the task queue to be handled by the plurality of graphics processing units.

17. A computer program product for statistical circuit simulation, comprising a non-transitory medium storing computer programs for execution by one or more computer systems, the computer program product comprising:
  code for providing descriptions of a circuit for simulation, wherein the descriptions include variations of statistical parameters of the circuit;
  code for partitioning the circuit into groups of netlists according to variations of statistical parameters of the circuit, wherein code for partitioning further comprises code for forming the groups of netlists according to proximity of variations of statistical parameters of the circuit, and wherein proximity of variations of statistical parameters comprises variations of threshold voltage of a transistor in a sub-threshold region, variations of threshold voltage of the transistor in a linear region, and variations of threshold voltage of the transistor in a saturation region;
  code for simulating the groups of netlists using a plurality of processors in parallel to generate a plurality of output data files, wherein the plurality of processors include a plurality of graphics processing units and a plurality of central processing units; and
  code for storing the plurality of output data files in a memory.

* * * * *